US012562441B2

(12) United States Patent
Kim

(10) Patent No.: US 12,562,441 B2
(45) Date of Patent: Feb. 24, 2026

(54) BATTERY MODULE COMPRISING SOLDER PIN FOR CONNECTION TO BUSBAR AND BATTERY PACK INCLUDING SAME

(71) Applicant: LG Energy Solution, Ltd., Seoul (KR)

(72) Inventor: Sung-Gyu Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 762 days.

(21) Appl. No.: 17/793,710

(22) PCT Filed: Apr. 2, 2021

(86) PCT No.: PCT/KR2021/004168
§ 371 (c)(1),
(2) Date: Jul. 19, 2022

(87) PCT Pub. No.: WO2021/256673
PCT Pub. Date: Dec. 23, 2021

(65) Prior Publication Data
US 2023/0049279 A1 Feb. 16, 2023

(30) Foreign Application Priority Data

Jun. 17, 2020 (KR) ........................ 10-2020-0073793

(51) Int. Cl.
H01M 50/569 (2021.01)
H01M 10/42 (2006.01)
(Continued)

(52) U.S. Cl.
CPC ....... H01M 50/569 (2021.01); H01M 10/425 (2013.01); H01M 10/482 (2013.01); H01M 50/204 (2021.01); H01M 50/509 (2021.01); H01M 50/51 (2021.01); H01M 2220/20 (2013.01)

(58) Field of Classification Search
CPC .. H01M 50/509; H01M 50/569; H01M 50/57; H01M 50/50
See application file for complete search history.

(56) References Cited

U.S. PATENT DOCUMENTS 9,620,763 B1 4/2017 Zeng et al.
2008/0030208 A1 2/2008 Aratani
(Continued)

FOREIGN PATENT DOCUMENTS

CN 103296321 A 9/2013
CN 104641130 A 5/2015
(Continued)

OTHER PUBLICATIONS

International Search Report for PCT/KR2021/004168 dated Jul. 22, 2021. 3 pgs.

*Primary Examiner* — Kenneth J Douyette
(74) *Attorney, Agent, or Firm* — Lerner David LLP

(57) ABSTRACT

A battery module, including battery cells connected in series or connected in series and in parallel, a plurality of bus bars connected to corresponding electrode leads of the battery cells, and a voltage sensing member having sensing parts respectively connected to the bus bars, each of the plurality of bus bars having a pin hole perforated therethrough in a thickness direction, and each of the sensing parts having a solder pin configured to be inserted into and released from the pin hole.

8 Claims, 5 Drawing Sheets

(51) Int. Cl.

| | | |
|---|---|---|
| *H01M 10/48* | (2006.01) |
| *H01M 50/204* | (2021.01) |
| *H01M 50/509* | (2021.01) |
| *H01M 50/51* | (2021.01) |

(56) References Cited

U.S. PATENT DOCUMENTS

| | | | |
|---|---|---|---|
| 2008/0199765 A1 | 8/2008 | Yoon et al. | |
| 2012/0068668 A1* | 3/2012 | Kittell | H01M 10/625 |
| | | | 429/71 |
| 2013/0143085 A1 | 6/2013 | Yoon | |
| 2013/0224564 A1 | 8/2013 | Kim | |
| 2014/0093332 A1 | 4/2014 | Hagan et al. | |
| 2015/0023392 A1 | 1/2015 | Noh | |
| 2015/0171401 A1 | 6/2015 | Kim et al. | |
| 2018/0088179 A1 | 3/2018 | Ota et al. | |
| 2018/0358588 A1 | 12/2018 | Sato et al. | |
| 2019/0389318 A1* | 12/2019 | Lee | H01M 50/516 |
| 2020/0147673 A1 | 5/2020 | Rodenburg et al. | |

FOREIGN PATENT DOCUMENTS

| | | | |
|---|---|---|---|
| CN | 107871839 A | 4/2018 |
| CN | 104412417 B | 6/2018 |
| CN | 109037506 A | 12/2018 |
| JP | 200839571 A | 2/2008 |
| JP | 201380619 A | 5/2013 |
| JP | 2013175432 A | 9/2013 |
| JP | 2015187910 A | 10/2015 |
| JP | 20193729 A | 1/2019 |
| JP | 202013766 A | 1/2020 |
| KR | 100936262 B1 | 1/2010 |
| KR | 101669116 B1 | 10/2016 |
| KR | 101698768 B1 | 1/2017 |
| KR | 101701761 B1 | 2/2017 |
| KR | 20170092740 A | 8/2017 |
| KR | 20180076163 A | 7/2018 |
| KR | 20180113365 A | 10/2018 |
| KR | 102024002 B1 | 9/2019 |

* cited by examiner

BATTERY MODULE COMPRISING SOLDER PIN FOR CONNECTION TO BUSBAR AND BATTERY PACK INCLUDING SAME

CROSS-REFERENCE TO RELATED APPLICATIONS

The present application is a national phase entry under 35 U.S.C. § 371 of International Application No. PCT/KR2021/004168 filed Apr. 2, 2021, which claims priority from Korean Patent Application No. 10-2020-0073793 filed Jun. 17, 2020, all of which are incorporated herein by reference.

TECHNICAL FIELD

The present disclosure relates to a battery module, and more particularly, to a battery module in which a connection structure between a bus bar and a voltage sensing member, required for sensing voltage of battery cells in the battery module, is improved, and a battery pack including the battery module.

BACKGROUND ART

A semi-permanent battery that converts electrical energy into chemical energy and may repeat charging and discharging is called a secondary battery, to be distinguished from a primary battery that cannot be reused after being used once.

The secondary battery include lithium secondary batteries, nickel cadmium (Ni—Cd) batteries, lead storage batteries, nickel hydrogen (Ni-MH) batteries, zinc air batteries, alkaline manganese batteries, and the like. Among them, lead storage batteries and lithium secondary batteries are the most actively commercialized secondary batteries.

In particular, the lithium secondary batteries are actively used as electric vehicle batteries since they have high energy storage density, light weight and compact size and have advantages such as excellent safety, low discharge rate and long life. For reference, the lithium secondary batteries are generally classified into cylindrical, rectangular and pouch types depending on their manufactured shapes and are also used for energy storage system (ESS) batteries and other electric devices as well as electric vehicle batteries.

Currently, it is impossible to obtain enough power to drive an electric vehicle by using just one lithium secondary battery (cell). In order to apply a secondary battery as an energy source of an electric vehicle, a battery module in which a plurality of lithium ion battery cells are connected in series and/or in parallel must be configured, and also a battery pack including, a Battery Management System (BMS), a cooling system, a Battery Disconnection Unit (BDU) and a harness wire for connecting and functionally maintaining such battery modules generally in series is configured.

Meanwhile, as shown in FIG. 1, if the battery module is configured as a pouch-type secondary battery cell, electrode leads 1*a*, 1*b* of the pouch-type secondary battery cell are welded to bus bars 3. The bus bars 3 are located at a front surface of the battery module or front and rear surfaces of the battery module, and a plurality of electrode leads 1*a*, 1*b* are welded to the bus bars 3 in one-to-one relationship, thereby connecting secondary battery cells in series and in parallel.

The voltage information of the secondary battery cells in the battery module is transmitted to the BMS through a sensing member 5 connected to each bus bar 3, and the BMS monitors the state of each secondary battery cell based on the voltage information to control charging/discharging of the secondary battery cells.

The voltage sensing member 5 employs a harness wire, a Flat Flexible Cable (FFC), a Flexible Printed Circuit Board (FPCB), or the like. Conventionally, the sensing member 5 and the bus bar 3 are electrically connected by compressing a metal terminal to an end of the sensing member 5 and laser-welding the metal terminal to the bus bar 3. However, the laser welding is expensive and difficult in quality control. Also, if the sensing member is defective, it is impossible to rework or replace only the sensing member. In particular, if even the secondary battery cell is welded to the bus bar, there is a disadvantage in that the secondary battery cell must also be discarded.

Accordingly, there is a demand for a connection method between the bus bar and the sensing member, which is easier to control quality than the prior art.

SUMMARY

Technical Problem

The present disclosure is designed to solve the problems of the related art, and therefore the present disclosure is directed to providing a battery module configured to easily and rapidly connecting a bus bar and a voltage sensing member and, if required, allow re-work.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

Various embodiments of the present disclosure to accomplish the object are as follows.

In an aspect of the present disclosure, there is provided a battery module, comprising: a plurality of battery cells either (i) connected in series or (ii) connected in series and in parallel; a plurality of bus bars, each bus bar connected to electrode leads of a respective one of the plurality of battery cells; and a voltage sensor including a plurality of sensing parts, each sensing part connected to a respective one of the plurality of bus bars, each sensing part including a respective solder pin, wherein each bus bar includes a respective pin hole extending through the bus bar a thickness direction of the bus bar, and for each sensing part, the solder pin of the sensing part is configured to be inserted into and released from the pin hole of the respective bus bar connected to the sensing part.

For each sensing part, the solder pin of the sensing part may include a base portion configured to be attached to a first surface of the sensing part; and a hole insert portion extending in a direction orthogonal to the base portion and configured to be inserted into the pin hole.

The hole insert portion may include a first post and a second post extending in parallel with each other.

Each of the first post and the second post may include a respective hook-shaped end portion, and each of the respective hook-shaped end portions may be configured to pass through the pin hole and hook to a rear surface of the bus bar.

For each bus bar, the pin hole of the bus bar may include a first hole region, wherein a diameter of the first hole region gradually decreases from a front surface of the bus bar to a predetermined depth in the thickness direction of the bus bar; and a second hole region connected to an end point of the first hole region and extending to the rear surface of the bus bar, wherein a diameter of the second hole region is uniform.

The base portion may include a plate with a predetermined thickness and at least one bead protruding from a surface of the plate.

The base portion may include a plurality of beads, and at least two beads of the plurality of beads are positioned symmetrically based on the hole insert portion.

Each sensing part may further include a respective bonding portion that is configured to be soldered and electrically connected to the base portion.

The voltage sensing member may be formed with a Flat Flexible Cable or a Flexible Printed Circuit Board.

In another aspect of the present disclosure, there is also provided a battery pack, comprising the battery module of any of the embodiments described herein.

Advantageous Effects

The battery module according to the present disclosure gives the following effects.

In the battery module of the present disclosure, the solder pin is mounted to the sensing part of the voltage sensing member. Since the bus bar and the sensing part are configured to be connected by inserting the solder pin into the pin hole of the bus bar, compared to the conventional welding method, it is possible to perform the corresponding task quickly and easily without an expert, thereby securing easy quality control.

In addition, the battery module of the present disclosure may remove the solder pin from the bus bar by using a jig. Therefore, if the voltage sensing member is defective, re-work is possible.

The effects of the present disclosure are not limited to the above, and effects not mentioned herein may be clearly understood from the present specification and the accompanying drawings by those skilled in the art.

BRIEF DESCRIPTION OF THE DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

DETAILED DESCRIPTION

Figure 1:
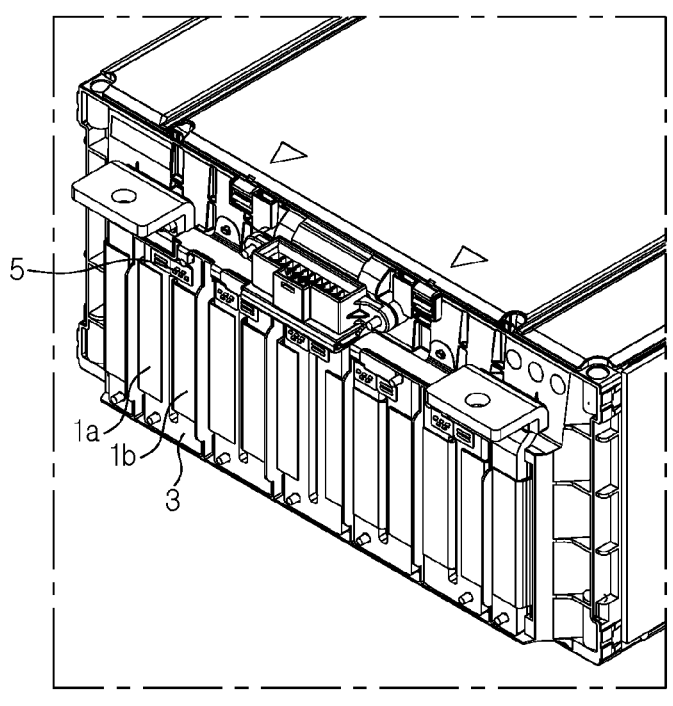
FIG. 1 is a partial perspective view showing a portion of a conventional battery module.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

The embodiments disclosed herein are provided for more perfect explanation of the present disclosure, and thus the shape, size and the like of components may be exaggerated, omitted or simplified in the drawings for better understanding. Thus, the size and ratio of components in the drawings do not wholly reflect the actual size and ratio.

Figure 2:
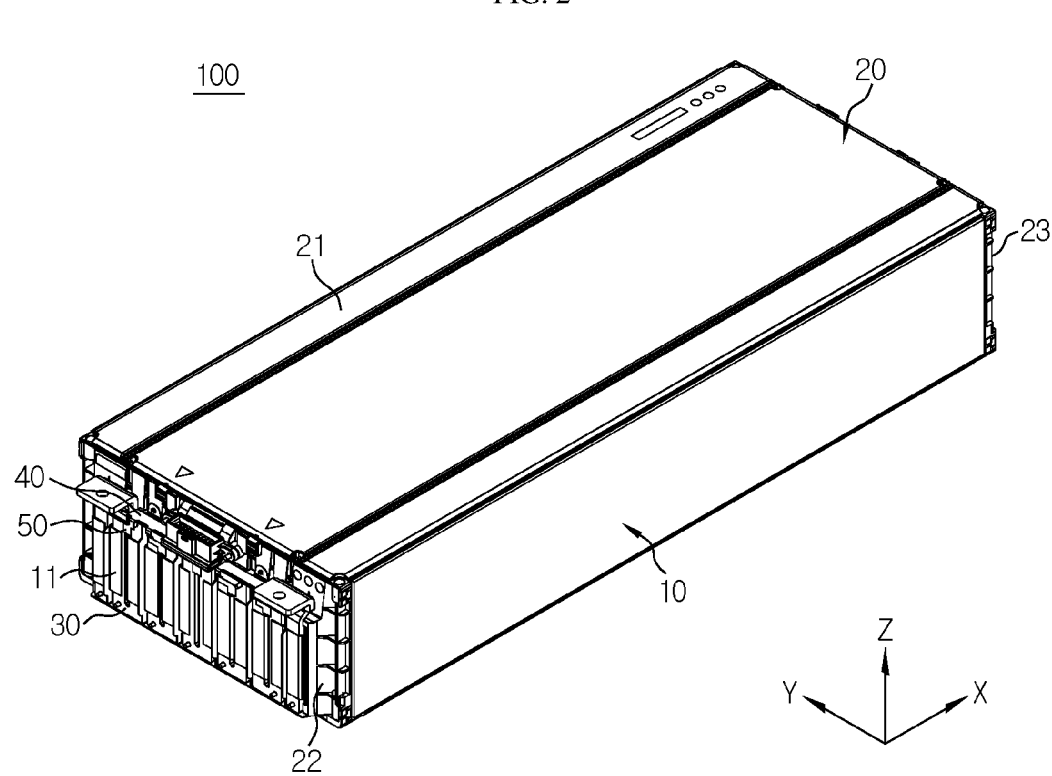
FIG. 2 is a perspective view showing a battery module according to an embodiment of the present disclosure.
Figure 3:
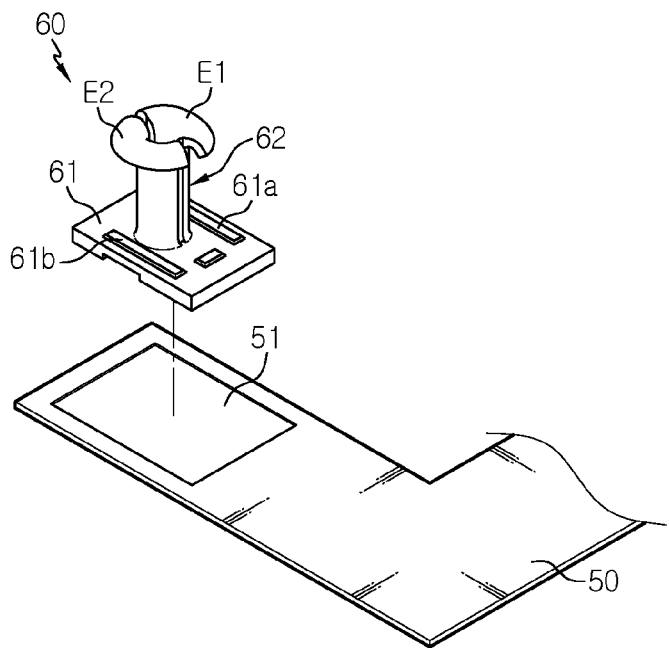
FIG. 3 is a diagram showing a sensing part and a solder pin according to an embodiment of the present disclosure.
Figure 4:
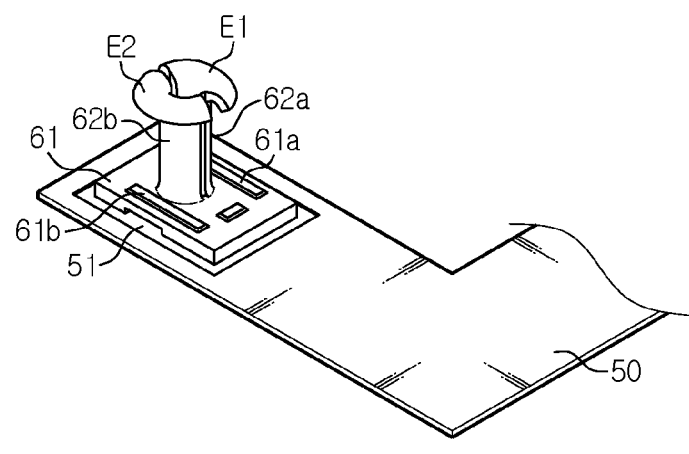
FIG. 4 is a diagram showing an example where the solder pin is mounted to the sensing part of FIG. 3.

FIG. 2 is a perspective view showing a battery module according to an embodiment of the present disclosure, FIG. 3 is a diagram showing a sensing part and a solder pin according to an embodiment of the present disclosure, and FIG. 4 is a diagram showing an example where the solder pin is mounted to the sensing part of FIG. 3.

Referring to these figures, the battery module 100 according to an embodiment of the present disclosure includes a cell stack 10, a bus bar frame assembly 20, a plurality of bus bars 30, and a voltage sensing member 40.

The cell stack 10 may be regarded as an aggregate of battery cells. For example, the battery cells may be stacked in a left and right direction and erected in a vertical direction to form the cell stack 10. As the battery cell, a pouch-type battery cell may be applied. The battery cell of this embodiment is a two-directional lead type pouch-type battery cell in which a positive electrode lead and a negative electrode lead are located at opposite sides.

The pouch-type battery cell may include an electrode assembly, an electrolyte, and a pouch exterior for packaging them.

Each electrode plate of the electrode assembly includes an electrode tab, and at least one electrode tab may be connected to the electrode lead 11. The electrode lead 11 may be exposed from the inside of the pouch exterior to the outside to function as an electrode terminal of the battery cell.

The pouch exterior may be configured to include a metal thin film, for example an aluminum foil, in order to protect internal components such as the electrode assembly and the electrolyte, supplement the electrochemical properties by the electrode assembly and the electrolyte, and improve heat dissipation. The aluminum foil may be interposed between the insulation layer formed of an insulating material and the inner adhesive layer in order to secure electrical insulation.

The bus bar frame assembly 20 is a component that supports the cell stack 10 and forms a place to install the plurality of bus bars 30. The bus bar frame assembly 20 includes a top frame 21, a front frame 22 and a rear frame 23.

The top frame 21 may be provided in a plate form having an area that may cover the entire cell stack 10 from the top of the cell stack 10. A part of the voltage sensing member 40 may be placed between the top frame 21 and the cell stack 10. As the voltage sensing member 40, an FFC (Flexible Flat Cable) or a FPCB (Flexible Printed Circuit Board) may be used.

The front frame 22 and the rear frame 23 are plate-shaped bodies having areas that may cover the front and rear surfaces of the cell stack 10, respectively, and may include slits for allowing the electrode leads 11 of the battery cells to pass therethrough in a front and rear direction, and a rib structure for supporting the bus bars 30 around the slits.

The front frame 22 and the rear frame 23 may be provided to be hinged to both ends of the top frame 21. In this case, when the electrode leads 11 of the battery cells are fitted into the slits, since the front frame 22 or the rear frame 23 may be rotated from the outside to the inside, the electrode leads 11 may be more easily fitted into the corresponding slits.

Meanwhile, the plurality of bus bars 30 according to the present disclosure may be fixedly coupled to the front frame 22 and the rear frame 23. The battery cells may be connected in series and in parallel by welding the electrode leads 11 to the bus bars 30 in a predetermined pattern. For example, the positive electrode leads of two or more battery cells are stacked, provided to pass through the slit to be pulled out to the front of the front frame 22, and then welded to one side of the bus bar 30. In addition, the negative electrode leads of two or more neighboring battery cells are overlapped, provided to pass through other slits to be pulled out to the front of the front frame 22, and then welded the other side of the bus bar 30 to which the positive electrode leads are attached. For the bus bar 30 located at the front of the rear frame 23, the electrode leads 11 are also welded in the same way. If the electrode leads 11 of the battery cells are welded to the bus bars 30 in this pattern, all battery cells may be connected in series and in parallel.

The battery module 100 includes a BMS (not shown, Battery Management System) for monitoring the state of the battery cells and controlling the charging and discharging of the battery cells, and a voltage sensing member 40 for sending a node voltage of the battery cells connected in series and transmitting the voltage information of each battery cell to the BMS. The voltage sensing member 40 and the BMS may be connected using a connector, a harness cable, or the like.

In this embodiment, the voltage sensing member 40 may be made of a FPCB (Flexible Printed Circuit Board). The FPCB is easy to form a fine pattern and has excellent flexibility, thereby enabling 3D wiring, so it is easy to arrange even within the battery module 100, which has a large space limitation.

The voltage sensing member 40 includes a body part (not shown) extending along a longitudinal direction of the cell stack 10 from the top of the cell stack 10, and a plurality of sensing parts 50 located at both ends of the body part (not shown) to extend in several branches.

Since the battery cells are connected in series through each bus bar 30, the voltage measured at each bus bar 30 corresponds to the node voltage of the battery cells connected in series. Accordingly, the plurality of sensing parts 50 are connected to the plurality of bus bars 30 in a one-to-one correspondence and sense voltages of the corresponding bus bars 30, respectively.

Meanwhile, in the conventional battery module 100, in order to connect each bus bar 30 and each sensing part 50, the metal terminal is compressed to one end of the sensing part 50, and the metal terminal and the bus bar 30 are laser-welded. However, once welded components are practically impossible to rework or replace, and quality control is difficult because the welding quality varies according to the skill of a worker. Accordingly, the present disclosure is configured so that each bus bar 30 and each sensing part 50 may be connected in a non-welding type as described below.

Each of the plurality of bus bars 30 according to the present disclosure has a pin hole 32 perforated therethrough in a thickness direction, and each the sensing part 50 has a solder pin 60 configured to be inserted into and released from the pin hole 32.

Referring to FIGS. 3 and 4, the solder pin 60 includes a base portion 61 and a hole insert portion 62 and is made of a metal material with electrical conductivity.

The base portion 61 may be provided in a plate shape that has a predetermined thickness and may be attached to one surface of the sensing part 50 to face the same. In addition, at least one bead 61*a*, 61*b* may be provided on the surface of the base portion 61. In this embodiment, three beads are provided, and two beads 61*a*, 61*b* among the beads are provided symmetrically with respect to the hole insert portion 62, but the scope of the present disclosure is not limited thereto. That is, the number and positions of the beads 61*a*, 61*b* may be configured differently from this embodiment.

As will be described later, the beads 61*a*, 61*b* of the base portion 61 compress and contact the surface of the bus bar 30 when the hole insert portion 62 is fastened to the pin hole 32 of the bus bar 30. The beads 61*a*, 61*b* may serve to prevent a gap between the bus bar 30 and the solder pin 60 by absorbing the tolerance.

The base portion 61 may be electrically connected to the bonding portion 51 provided at an end region of the sensing part 50 by a reflow process.

Since each sensing part 50 of this embodiment is a portion of the voltage sensing member 40, the sensing part 50 is configured as a flexible printed circuit board, like the voltage sensing member 40. Each sensing part 50 includes a conductor pattern (not shown) and an outer film layer for covering the conductor pattern.

The bonding portion 51 of the sensing part 50 may be regarded as a portion in which the conductor pattern (not shown) is exposed by removing the outer film layer partially. The solder pin 60 and the sensing part 50 may be electrically connected by interposing a solder cream on the bonding portion 51 and applying heat thereto to melt the solder cream so that the base portion 61 is attached thereon.

The hole insert portion 62 may extend in a direction orthogonal to the base portion 61 and may be provided to be inserted into the pin hole 32 of the bus bar 30.

Specifically, the hole insert portion 62 of this embodiment includes a first post 62*a* and a second post 62*b* formed to extend in parallel with each other. The first post 62*a* and the second post 62*b* have end portions E1, E2 formed in a hook shape, respectively.

The hook-shaped end portions E1, E2 may pass through the pin hole 32 of the bus bar 30 and be hooked to a rear surface of the bus bar 30.

Figure 5:
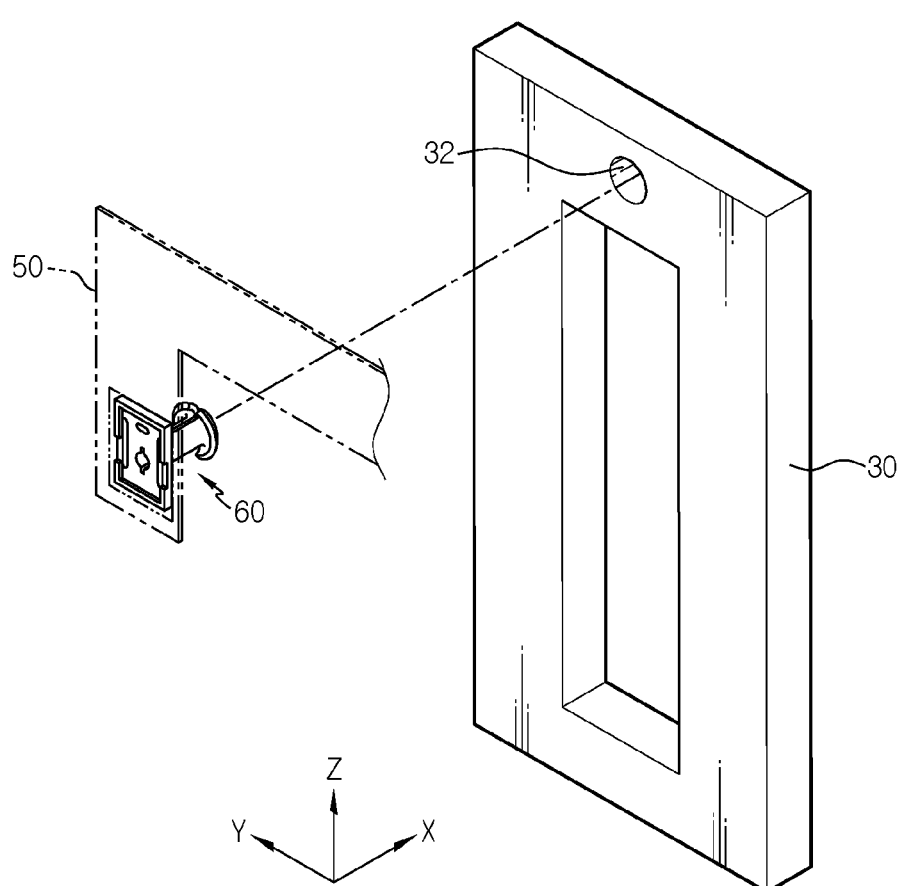
FIGS. 5 and 6 are diagrams showing an assembling process between a bus bar and the sensing part according to an embodiment of the present disclosure.
Figure 6:
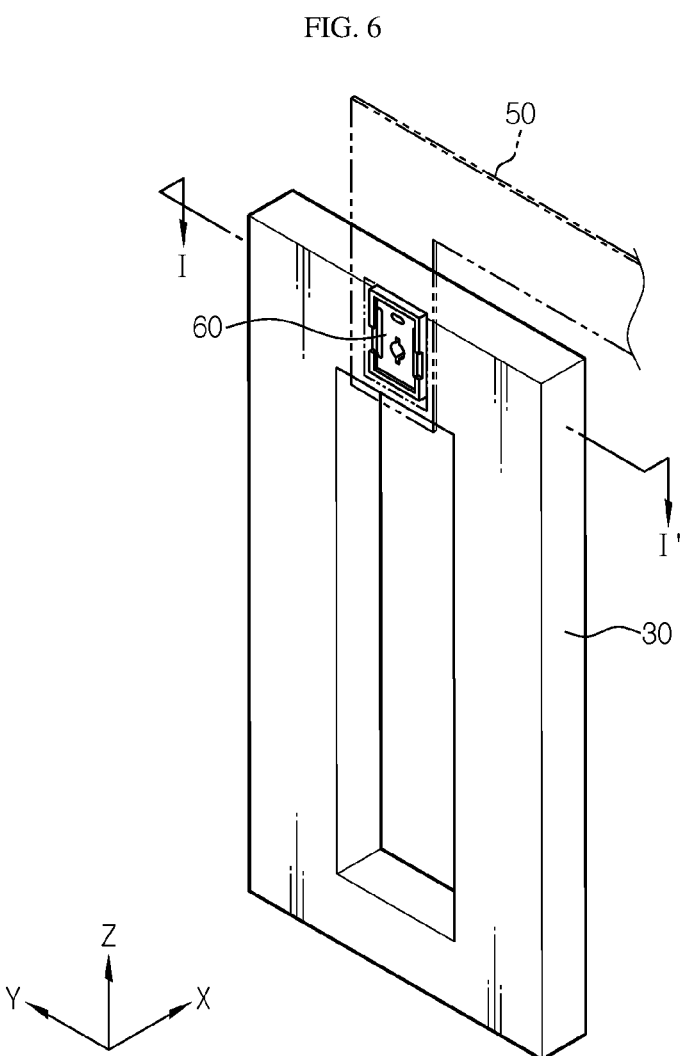
Figures 7, 8:
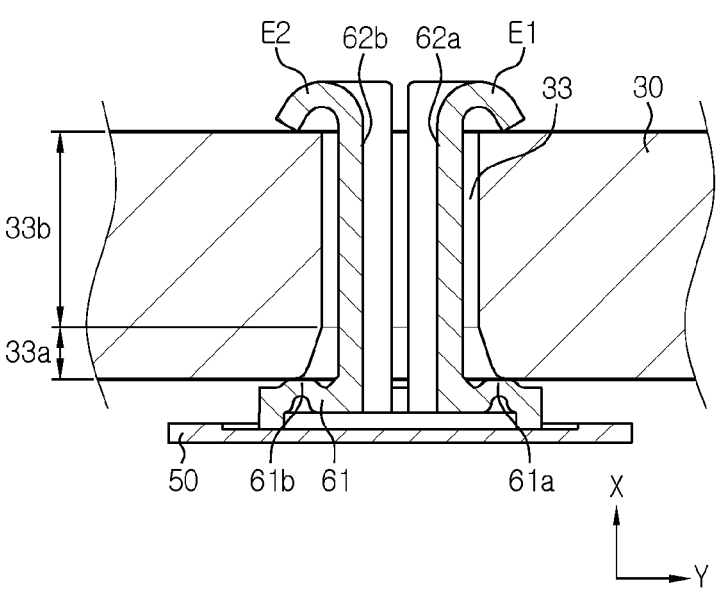
FIG. 7 is a sectional view, taken along the line I-I' of FIG. 6.
FIG. 8 is a diagram corresponding to FIG. 7 to show a modified example of the pin hole.

FIGS. 5 and 6 are diagrams showing an assembling process between the bus bar 30 and the sensing part 50 according to an embodiment of the present disclosure, and FIG. 7 is a sectional view, taken along the line I-I' of FIG. 6.

Next, a connection method and a connection structure of the bus bar 30 and the sensing part 50 according to an embodiment of the present disclosure will be described with reference to FIGS. 5 to 7.

Each bus bar 30 and each sensing part 50 may be connected after assembling the bus bar frame assembly 20 and the cell stack 10. When assembling the bus bar frame assembly 20 and cell stack 10, the voltage sensing member 40 may be disposed at an upper portion of the cell stack 10 in a state of being attached to a lower surface of the top frame 21.

The bus bars 30 are mounted at predetermined positions of the front frame 22 and the rear frame 23, and each sensing part 50 may be positioned to correspond to the upper portion of each bus bar 30.

In this state, as shown in FIGS. 5 and 6, the solder pin 60 part of the sensing part 50 is inserted into the pin hole 32 of the bus bar 30. At this time, the hole insert portion 62 is forcibly pressed into the pin hole 32 so that the first post 62*a* and the second post 62*b*, which are spread apart, may be closed. The hole insert portion 62 inserted in this way does not fall out in a reverse direction again since the hook-shaped end portions E1, E2 are hooked on the rear surface of the bus bar 30.

That is, referring to FIG. 7, after the end portion E1 of the first post 62*a* and the end portion E2 of the second post 62*b* come out to the opposite side of the pin hole 32, they are stretched back to their original state by elasticity and thus hooked on the rear surface of the bus bar 30. Therefore, even if the solder pin 60 is pulled in a reverse direction, the solder pin 60 does not come out again from the pin hole 32 of the bus bar 30.

Preferably, when the solder pin 60 is fastened to the bus bar 30, the contact portion of the bus bar 30 is compressed to about 0.05 mm or less by the beads 61*a*, 61*b* of the base portion 61, and the length of the hole insert portion 62 compared to the thickness of the bus bar 30 may be determined to contact the beads 61*a*, 61*b*.

When performing re-work or replacement, a jig (not shown) is used to close the end portion E1 of the first post 62*a* and the end portion E2 of the second post 62*b* again, and push the same in a reverse direction (−X-axis direction) so that the solder pin 60 is withdrawn from the bus bar 30.

As described above, according to the configuration according to an embodiment of the present disclosure and their actions, the bus bar 30 and the sensing part 50 can be easily and quickly connected by a non-welding method, and the bus bar has a stronger connection strength than that connected by welding. 30 and sensing part 50 can be connected.

By the configuration and operations according to an embodiment of the present disclosure as described above, the bus bar 30 and the sensing part 50 may be easily and rapidly connected in a non-welding method, and the bus bar 30 and the sensing part 50 may be connected with a stronger connection strength, compared to welding.

Also, according to the present disclosure, it is possible to rework the connection between the bus bar 30 and the sensing part 50. Further, if a problem occurs in the voltage sensing member 40, it is possible to replace only the voltage sensing member 40 with a new one.

Next, another embodiment of the present disclosure will be described with reference to FIG. 8. The same reference numerals as those in the former embodiment denote the same components, and the same components will not be described again, and different features from the former embodiment will be mainly described.

The battery module 100 according to another embodiment of the present disclosure is different from the battery module 100 of the former embodiment in view of the shapes of the bus bar 30 and the pin hole 33.

Referring to FIG. 8, the pin hole 33 includes a first hole region 33*a* formed to have a diameter gradually decreasing from a front surface of the bus bar 30 to a predetermined depth, a second hole region 33*b* connected to an end point of the first hole region 33*a* and having a constant diameter to the rear surface of the bus bar 30.

The end portions E1, E2 of the hole insert portion 62 may pass from the first hole region 33*a* and exit to the rear surface of the bus bar 30 through the second hole region 33*b*. The diameter of a portion where the first hole region 33*a* starts may be formed to be identical to or slightly smaller than the widths of the end portions E1, E2 of the hole insert portion 62, and the diameter may gradually decrease as being closer to the second hole region 33*b*.

If the pin hole 33 of the bus bar 30 is configured as in this embodiment, if the end portions E1, E2 of the hole insert portion 62 are closed with a slight force and slightly placed over the pin hole 33 and then a force is applied in a positive direction (X-axis direction), the hole insert portion 62 may be easily inserted into the pin hole 33. Therefore, in this embodiment, there is an advantage that each sensing part 50 and each bus bar 30 may be connected more easily, compared to the former embodiment.

Meanwhile, a battery pack according to the present disclosure may include at least one battery module of the present disclosure. In addition to the battery module, the battery pack according to the present disclosure may further include a pack case for accommodating the battery module, and various devices for controlling charge and discharge of each battery module such as a master BMS, a current sensor, a fuse or the like.

The battery module according to the present disclosure may be applied to a vehicle such as an electric vehicle or a hybrid electric vehicle. That is, the vehicle may include the battery module according to the present disclosure.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, when the terms indicating up, down, left, right, front and rear directions are used in the specification, it is obvious to those skilled in the art that these merely represent relative locations for convenience in explanation and may vary based on a location of an observer or an object to be observed.

What is claimed is:

1. A battery module, comprising:
a plurality of battery cells either (i) connected in series or (ii) connected in series and in parallel;
a plurality of bus bars, each bus bar connected to electrode leads of a respective one of the plurality of battery cells; and
a voltage sensor including a plurality of sensing parts, each sensing part connected to a respective one of the plurality of bus bars, each sensing part including a respective solder pin,
wherein each bus bar includes a respective pin hole extending through the bus bar in a thickness direction of the bus bar, and
for each sensing part, the solder pin of the sensing part is configured to be inserted into the pin hole of the respective bus bar connected to the sensing part and includes at least one elongated member that extends through the pin hole and releasably affixes to the bus bar,
wherein for each sensing part, the solder pin of the sensing part includes:
a base portion configured to be attached to a first surface of the sensing part; and a hole insert portion extending in a direction orthogonal to the base portion and configured to be inserted into the pin hole, wherein the hole insert portion includes the at least one elongated member, and wherein the hole insert portion includes a first post and a second post extending in parallel with each other.

2. The battery module according to claim 1, wherein each of the first post and the second post includes a respective hook-shaped end portion, and each of the respective hook-shaped end portions is configured to pass through the pin hole and hook to a rear surface of the bus bar.

3. The battery module according to claim 2, wherein for each bus bar, the pin hole of the bus bar includes:

a first hole region, wherein a diameter of the first hole region gradually decreases from a front surface of the bus bar to a predetermined depth in the thickness direction of the bus bar; and a second hole region connected to an end point of the first hole region and extending to the rear surface of the bus bar, wherein a diameter of the second hole region is uniform.

4. The battery module according to claim 1, wherein the base portion includes a plate with a predetermined thickness and at least one bead protruding from a surface of the plate.

5. The battery module according to claim 4, wherein the base portion includes a plurality of beads, and at least two beads of the plurality of beads are positioned symmetrically based on the hole insert portion.

6. The battery module according to claim 1, wherein each sensing part further includes a respective bonding portion that is configured to be soldered and electrically connected to the base portion.

7. The battery module according to claim 1, wherein the voltage sensing member is a flat flexible cable or a flexible printed circuit board.

8. A battery pack, comprising the battery module according to claim 1.

\* \* \* \* \*